(12) United States Patent
Jiang

(10) Patent No.: US 11,432,169 B2
(45) Date of Patent: Aug. 30, 2022

(54) CHANNEL SENSING METHOD AND COMMUNICATION DEVICE

(71) Applicant: VIVO MOBILE COMMUNICATION CO., LTD., Guangdong (CN)

(72) Inventor: Lei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 98 days.

(21) Appl. No.: 16/962,858

(22) PCT Filed: Jan. 7, 2019

(86) PCT No.: PCT/CN2019/070601
§ 371 (c)(1),
(2) Date: Jul. 17, 2020

(87) PCT Pub. No.: WO2019/141099
PCT Pub. Date: Jul. 25, 2019

(65) Prior Publication Data
US 2020/0351679 A1    Nov. 5, 2020

(30) Foreign Application Priority Data

Jan. 18, 2018   (CN) .......................... 201810050692.9

(51) Int. Cl.
*H04W 24/02*   (2009.01)
*H04L 5/00*   (2006.01)
(Continued)

(52) U.S. Cl.
CPC ........... *H04W 24/02* (2013.01); *H04L 5/0092* (2013.01); *H04W 16/14* (2013.01); *H04W 16/28* (2013.01); *H04W 24/08* (2013.01); *H04W 52/367* (2013.01)

(58) Field of Classification Search
CPC ..... H04W 24/02; H04W 16/14; H04W 16/28; H04W 24/08; H04W 52/367;
(Continued)

(56) References Cited

U.S. PATENT DOCUMENTS

2015/0071335 A1   3/2015   Breslin et al.
2015/0373652 A1   12/2015   Dabeer et al.
(Continued)

FOREIGN PATENT DOCUMENTS

CN    104734798 A    6/2015
CN    105101283 A    11/2015
(Continued)

OTHER PUBLICATIONS

3GPP TSG RAN WG1 Meeting #81 R1-153228, Fukuoka, Japan, May 25-29, 2015 (Year: 2015).*
(Continued)

*Primary Examiner* — Ayaz R Sheikh
*Assistant Examiner* — Louis Samara
(74) *Attorney, Agent, or Firm* — Brooks Kushman P.C.

(57) ABSTRACT

A channel sensing method and a communication device are provided. The method is applied to a communication device operating in an unlicensed band. The method includes: determining an energy detection threshold in a spatial-domain transmission direction according to an antenna gain in the spatial-domain transmission direction; wherein the antenna gain includes at least one of an antenna transmission gain and an antenna reception gain.

20 Claims, 3 Drawing Sheets

Determining an energy detection threshold in a spatial-domain transmission direction according to an antenna gain in the spatial-domain transmission direction — S210

(51) Int. Cl.
*H04W 16/14* (2009.01)
*H04W 16/28* (2009.01)
*H04W 24/08* (2009.01)
*H04W 52/36* (2009.01)

(58) Field of Classification Search
CPC .. H04W 48/16; H04W 72/005; H04L 5/0092; H04L 5/0053; H04L 1/0071; H04L 5/0094; H04L 5/0057; H04B 7/0695
See application file for complete search history.

(56) References Cited

U.S. PATENT DOCUMENTS

| | | |
|---|---|---|
| 2016/0037560 A1 | 2/2016 | Liu et al. |
| 2017/0085326 A1 | 3/2017 | Li et al. |
| 2017/0318489 A1 | 11/2017 | Sun et al. |
| 2018/0234863 A1* | 8/2018 | Li ............ H04L 1/0009 |
| 2018/0242232 A1* | 8/2018 | Chendamarai Kannan ............ H04W 72/0453 |
| 2018/0352577 A1* | 12/2018 | Zhang ............ H04W 16/14 |
| 2018/0376339 A1 | 12/2018 | Hu et al. |
| 2019/0141546 A1* | 5/2019 | Zhou ............ H04L 5/0057 |
| 2019/0191460 A1* | 6/2019 | Chendamarai Kannan ............ H04W 72/1236 |
| 2020/0137796 A1* | 4/2020 | Jung ............ H04W 24/08 |
| 2020/0288479 A1* | 9/2020 | Xi ............ H04W 72/042 |
| 2020/0314906 A1* | 10/2020 | Goyal ............ H04B 7/0695 |
| 2020/0383136 A1* | 12/2020 | Xie ............ H04W 48/16 |
| 2021/0336750 A1* | 10/2021 | Zhou ............ H04L 5/0094 |

FOREIGN PATENT DOCUMENTS

| | | |
|---|---|---|
| CN | 105577291 A | 5/2016 |
| CN | 106452705 A | 2/2017 |
| CN | 106664723 A | 5/2017 |
| WO | 2017061934 A1 | 4/2017 |
| WO | 2017134530 A1 | 8/2017 |
| WO | 2019031141 A1 | 2/2019 |

OTHER PUBLICATIONS

3GPP TSG RAN WG1 Meeting #81, R1-153228, Fukuoka, Japan, May 25-29, 2015. "UL transmission design for LAA", 6 pages.
International Preliminary Report on Patentability and Written Opinion dated Jul. 30, 2020 issued in PCT/CN2019/070601.
First Office Action dated Mar. 4, 2020 issued in Chinese Application No. 201810050692.9.
Partial Supplementary Search Report dated Nov. 4, 2020 issued in PCT/CN2019/070601.
3GPP TSG RAN WG1 Meeting 91, R1-1720475, Reno, US Nov. 27-Dec. 2, 2017, High Level Views of NR-U BWP.

* cited by examiner

Determining an energy detection threshold in a spatial-domain transmission direction according to an antenna gain in the spatial-domain transmission direction — S210

Determining an energy detection threshold on a Bandwidth Part (BWP) according to a bandwidth of the BWP ∽S310
FIG. 3
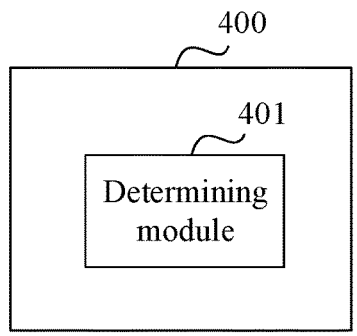
FIG. 4
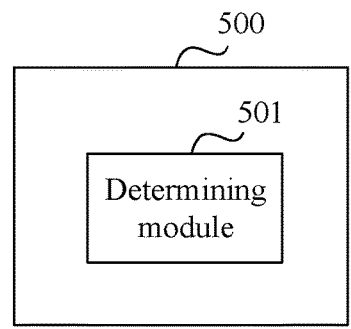
FIG. 5

CHANNEL SENSING METHOD AND COMMUNICATION DEVICE

CROSS-REFERENCE TO RELATED APPLICATION

This application is a U.S. national phase application of a PCT Application No. PCT/CN2019/070601 filed on Jan. 7, 2019, which claims a priority to Chinese Patent Application No. 201810050692.9 filed in China on Jan. 18, 2018, the disclosures of which are incorporated in their entirety by reference herein.

TECHNICAL FIELD

The present disclosure relates to the field of communications, and in particular, to a channel sensing method and a communication device.

BACKGROUND

A new radio (New Radio, NR) system in the Fifth-Generation (5G) mobile communication has advantages of high reliability, a low latency, a large bandwidth and a wide coverage, which is an evolution direction of mobile communications system in the future. In the NR system, an unlicensed band may be used as a supplement to a licensed band to assist an operator in expanding a communication service of the operator.

Since the unlicensed band is shared by a variety of technologies such as a WiFi, a radar, a LTE-LAA, etc, it is necessary to sense a channel firstly when the unlicensed band is to be used and a rule of listening before talk (listen before talk, LBT) is required to be satisfied, so as to ensure all devices may use a resource of the unlicensed band fairly. Specifically, the energy detection threshold for sensing the channel is set; in a channel sensing process, if a received power is greater than or equal to the energy detection threshold, then the channel is considered to be busy; if the received power is less than the energy detection threshold, then the channel is considered to be idle. Information can only be transmitted when the channel is idle.

However, in the NR system, due to directionality of transmission in a spatial domain and introduction of a Band Width Part (BWP), there is still no corresponding scheme to accurately determine the energy detection threshold for sensing a channel.

SUMMARY

In a first aspect, embodiments of the present disclosure provide a channel sensing method. The method is applied to a communication device operating in an unlicensed band, the method includes: determining an energy detection threshold in a spatial-domain transmission direction, according to an antenna gain in the spatial-domain transmission direction; wherein the antenna gain includes at least one of an antenna transmission gain and an antenna reception gain.

In a second aspect, some embodiments of the present disclosure further provide a channel sensing method. The method is applied to a communication device operating in an unlicensed band, the method includes: determining an energy detection threshold of a Bandwidth Part (BWP), according to a bandwidth of the BWP.

In a third aspect, some embodiments of the present disclosure further provide a communication device. The communication device is capable of operating in an unlicensed band, the communication device includes: a determining module, used for determining an energy detection threshold in a spatial-domain transmission direction according to an antenna gain in the spatial-domain transmission direction; wherein the antenna gain includes at least one of an antenna transmission gain and an antenna reception gain.

In a fourth aspect, some embodiments of the present disclosure further provide a communication device. The communication device is capable of operating in an unlicensed band, the communication device includes: a determining module, used for determining an energy detection threshold of a Bandwidth Part (BWP) according to a bandwidth of the BWP.

In a fifth aspect, some embodiments of the present disclosure provide a communication device. The communication device includes a storage, a processor, and a computer program stored on the storage and executable by the processor, wherein, when the computer program is executed by the processor, the processor implements the steps in the method according to the first aspect.

In a sixth aspect, some embodiments of the present disclosure also provide a computer readable storage medium on which a computer program is stored, wherein when the computer program is executed by a processor, the processor implements the steps in the method according to the first aspect.

In a seventh aspect, some embodiments of the present disclosure provide a communication device. The communication device includes a storage, a processor, and a computer program stored on the storage and executable by the processor, wherein, when the computer program is executed by the processor, the processor implements the steps in the method according to the second aspects.

In an eighth aspect, some embodiments of the present disclosure also provide a computer readable storage medium on which a computer program is stored, wherein when the computer program is executed by a processor, the processor implements the steps in the method according to the second aspect.

BRIEF DESCRIPTION OF THE DRAWINGS

In order to more clearly explain technical solutions of the embodiments of the present disclosure, accompany drawings to be used in description of the embodiments of the present disclosure will be briefly described below. It will be apparent that, the drawings in the following description are only some embodiments of the present disclosure, and other drawings may be obtained from these drawings without paying creative labor by those of ordinary skill in the art.

FIG. 3 is a flowchart of another channel sensing method provided by some embodiments of the present disclosure;

FIG. 4 is a schematic structural diagram of a communication device provided by some embodiments of the present disclosure;

FIG. 5 is a schematic structural diagram of another communication device provided by some embodiments of the present disclosure;

DETAILED DESCRIPTION

The technical solutions in the embodiments of the present disclosure will be clearly and completely described below in conjunction with the accompanying drawings in the embodiments of the present disclosure. It is apparent that the described embodiments are a part, rather than all, of the embodiments of the present disclosure. According to the embodiments of the present disclosure, all other embodiments obtained by those of ordinary skill in the art without paying creative labor are within the protection scope of the present disclosure.

Figures 1, 2:
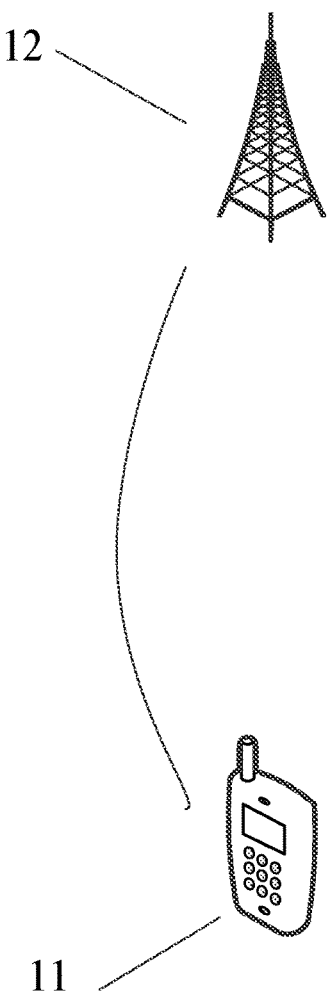
FIG. 1 is a schematic figure of a network architecture provided by embodiments of the present disclosure.
FIG. 2 is a flowchart of a channel sensing method provided by some embodiments of the present disclosure.

Referring to FIG. 1, FIG. 1 is a schematic figure of a network architecture provided by some embodiments of the present disclosure. As shown in FIG. 1, the network architecture includes a user terminal 11 and a base station 12, wherein the user terminal 11 may be a UE (User Equipment), for example, a terminal-side device such as a mobile phone, a tablet personal computer (Tablet Personal Computer), a laptop computer (Laptop Computer), a personal digital assistant (personal digital assistant, PDA for short), a mobile internet device (Mobile Internet Device, MID) or a wearable device. It should be noted that in the embodiments of the present disclosure, a specific type of the user terminal 11 is not limited. The above base station 12 may be a 5G base station (e.g., gNB, 5G NR NB) or a later version of a base station, or a base station in other communication systems, or referred to as a Node B. In the embodiments of the present disclosure, only the 5G base station is taken as an example, but the specific type of base station 12 is not limited.

It should be noted that specific functions of the user terminal 11 and the base station 12 described above will be described in detail by the following embodiments.

It should be understood that in the following embodiments of the present disclosure, a communication device may be a user terminal, may be a base station, may be another communication device configured with a plurality of spatial-domain transmission directions, or may also be other communication devices configured with multiple bandwidth parts (BWPs), which are not specifically limited herein.

First Embodiment

FIG. 2 is a flowchart of a channel sensing method provided by some embodiments of the present disclosure. The method is applied to a communication device operating in an unlicensed band, the method includes a Step S210.

Step S210: determining an energy detection threshold in a spatial-domain transmission direction, according to an antenna gain in the spatial-domain transmission direction.

The antenna gain includes at least one of following: an antenna transmission gain and an antenna reception gain.

In practical application, the communication device may be configured with at least one spatial-domain transmission direction, and antenna gains in different spatial-domain transmission directions are different or partially different. In order to avoid a problem that accuracy of sensing a channel using the same energy detection threshold in different spatial-domain transmission directions results in a lower sensing accuracy, when the energy detection threshold in a certain spatial-domain transmission direction is to be determined, the antenna gain in the spatial-domain transmission direction needs to be considered.

Manners of determining the energy detection threshold in the spatial-domain transmission direction according to the antenna gain in the spatial-domain transmission direction include, but are not limited to: following two ways.

A first way is as follows.

In the embodiments of the present disclosure, determining the energy detection threshold in the spatial-domain transmission direction, according to the antenna gain in the spatial-domain transmission direction includes: determining the energy detection threshold in the spatial-domain transmission direction, according to an initial energy detection threshold and the antenna gain in the spatial-domain transmission direction, wherein the initial energy detection threshold is less than or equal to a maximum energy detection threshold of the communication device.

In particular, determining the energy detection threshold in the spatial-domain transmission direction, according to an initial energy detection threshold and the antenna gain in the spatial-domain transmission direction, includes: correcting the initial energy detection threshold, according to the antenna gain in the spatial-domain transmission direction, to obtain a first energy detection threshold after the correction; and determining the first energy detection threshold as the energy detection threshold in the spatial-domain transmission direction.

The communication device sets the maximum energy detection threshold $X_{Thresh\_max}$ of the communication device, according to a maximum transmission power of the communication device or a transmission bandwidth supported by the communication device, and further, sets an energy detection threshold $X_{Thresh}$ less than or equal to the maximum energy threshold $X_{Thresh\_max}$ of the communication device as the initial energy detection threshold, and the initial energy detection threshold takes the same value in different spatial-domain transmission directions.

In each spatial-domain transmission direction, the initial energy detection threshold $X_{Thresh}$ is corrected according to the antenna gain in the spatial-domain transmission direction, so as to obtain the first energy detection threshold after the correction, and further the first energy detection threshold is determined as the energy detection threshold in the spatial-domain transmission direction.

For example, the initial energy detection threshold $X_{Thresh}$ is corrected according to an antenna transmission gain $A_{Tx}(\theta)$ and an antenna reception gain $A_{Rx}(\theta)$ in the spatial-domain transmission direction $\theta$, so as to obtain the first energy detection threshold $X_{Thresh}(\theta)$ after the correction, the first energy detection threshold $X_{Thresh}(\theta)$ after the correction is a function $X_{Thresh}(\theta)=f(X_{Thresh}, A_{Tx}(\theta), A_{Rx}(\theta))$ of the initial energy detection threshold $X_{Thresh}$, the antenna transmission gain $A_{Tx}(\theta)$, and the antenna reception gain $A_{Rx}(\theta)$, and further the first energy detection threshold $X_{Thresh}(\theta)$ is determined to be the energy detection threshold in the spatial-domain transmission direction $\theta$.

It should be noted that the function $f(X_{Thresh}, A_{Tx}(\theta), A_{Rx}(\theta))$ with respect to the initial energy detection threshold $X_{Thresh}$, the antenna transmission gain $A_{Tx}(\theta)$, and the antenna reception gain $A_{Rx}(\theta)$ may be a linear function or a non-linear function, which is not specifically limited here.

In some embodiments of the present disclosure, correcting the initial energy detection threshold according to the antenna gain in the spatial-domain transmission direction, to obtain a first energy detection threshold after the correction, includes: determining a linear superposition result of functions related to the antenna gain in the spatial-domain transmission direction and the initial energy detection threshold as the first energy detection threshold.

For example, the initial energy detection threshold $X_{Thresh}$ is corrected according to the antenna transmission gain $A_{Tx}$ (θ) and the antenna reception gain $A_{Rx}$ (θ) in the spatial-domain transmission direction 9, so as to obtain the first energy detection threshold $X_{Thresh}$ (θ) after the correction. The first energy detection threshold $X_{Thresh}$ (θ) after the correction is a linear superposition result of the functions related to the initial energy detection threshold $X_{Thresh}$ the antenna transmission gain $A_{Tx}$ (θ), and the antenna reception gain $A_{Rx}$ (θ), as shown in Formula 1 below:

$$X_{Thresh}(\theta) = X_{Thresh} + g_{Tx}(A_{Tx}(\theta)) + g_{Rx}(A_{Rx}(\theta)) \quad \text{Formula 1}$$

$g_{Tx}$ ($A_{Tx}$ (θ)) represents a function related to the antenna transmission gain $A_{Tx}$ (θ), $g_{Rx}$ ($A_{Rx}$ (θ)) represents a function related to the antenna reception gain $A_{Rx}$ (θ), and the first energy detection threshold $X_{Thresh}$ (θ) is the energy detection threshold in the spatial-domain transmission direction θ.

After the communication device determines the energy detection threshold $X_{Thresh}$ (θ) in the spatial-domain transmission direction θ, the communication device may perform channel-sensing in the spatial-domain transmission direction θ according to the energy detection threshold $X_{Thresh}$ (θ).

The communication device sets an initial energy detection threshold according to the maximum energy detection threshold, and then corrects the initial energy detection threshold according to the antenna gain in the spatial-domain transmission direction θ, and determines the energy detection threshold obtained after the correction as the energy detection threshold in the spatial-domain transmission direction θ, thereby achieving more accurate determination of energy detection thresholds for channel-sensing in multiple spatial-domain transmission directions.

A second way is as follows.

In the embodiments of the present disclosure, determining the energy detection threshold in the spatial-domain transmission direction, according to the antenna gain in the spatial-domain transmission direction includes: determining a maximum energy detection threshold in the spatial-domain transmission direction, according to a maximum energy detection threshold of the communication device and the antenna gain in the spatial-domain transmission direction; determining an energy detection threshold smaller than or equal to the maximum energy detection threshold in the spatial-domain transmission direction, as the energy detection threshold in the spatial-domain transmission direction.

In particular, determining the maximum energy detection threshold in the spatial-domain transmission direction according to the maximum energy detection threshold of the communication device and the antenna gain in the spatial-domain transmission direction, includes: correcting the maximum energy detection threshold of the communication device according to the antenna gain in the spatial-domain transmission direction, to obtain a second energy detection threshold after the correction; and determining the second energy detection threshold as the maximum energy detection threshold in the spatial-domain transmission direction.

The communication device sets the maximum energy detection threshold $X_{Thresh\_max}$ of the communication device according to a maximum transmission power of the communication device or a transmission bandwidth supported by the communication device, and corrects the maximum energy detection threshold $X_{Thresh\_max}$ according to the antenna gain in the spatial-domain transmission direction, to obtain the second energy detection threshold after the correction, and further determines the second energy detection threshold as the maximum energy detection threshold in the spatial-domain transmission direction.

In each spatial-domain transmission direction, after the maximum energy detection threshold in the spatial-domain transmission direction is determined, an energy detection threshold smaller than or equal to the maximum energy detection threshold in the spatial-domain transmission direction is set as the energy detection threshold in the spatial-domain transmission direction.

For example, the maximum energy detection threshold $X_{Thresh\_max}$ is corrected according to an antenna transmission gain $A_{Tx}$(θ) and an antenna reception gain $A_{Rx}$(θ) in the spatial-domain transmission direction θ, so as to obtain the second energy detection threshold $X_{Thresh\_max}$ (θ) after the correction, the second energy detection threshold $X_{Thresh\_max}$ (θ) is a function of the maximum energy detection threshold $X_{Thresh\_max}$ of the communication device, the antenna transmission gain $A_{Tx}$ (θ), and the antenna reception gain $A_{Rx}$ (θ), shown as a Formula 2.

$$X_{Thresh\_max}(\theta) = f(X_{Thresh\_max}, A_{Tx}(\theta), A_{Rx}(\theta)) \quad \text{Formula 2}$$

Further, the second energy detection threshold $X_{Thresh\_max}$ (θ) is determined as the maximum energy detection threshold in the spatial-domain transmission direction θ.

It should be noted that the function f($X_{Thresh\_max}$, $A_{Tx}$ (θ), $A_{Rx}$ (θ)) with respect to the maximum energy detection threshold $X_{Thresh\_max}$ of the communication device, the antenna transmission gain $A_{Tx}$ (θ) and the antenna reception gain $A_{Rx}$ (θ) may be a linear function or a non-linear function, which is not specifically limited here.

In some embodiments of the present disclosure, correcting the maximum energy detection threshold of the communication device according to the antenna gain in the spatial-domain transmission direction, to obtain the second energy detection threshold after the correction, includes: determining a linear superposition result of functions related to the maximum energy detection threshold of the communication device and the antenna gain in the spatial-domain transmission direction as the second energy detection threshold.

For example, the maximum energy detection threshold $X_{Thresh\_max}$ is corrected according to the antenna transmission gain $A_{Tx}$ (θ) and the antenna reception gain $A_{Rx}$ (θ) in the spatial-domain transmission direction θ, so as to obtain the second energy detection threshold $X_{Thresh\_max}$ (θ) after the correction. The second energy detection threshold $X_{Thresh\_max}$ (θ) is a linear superposition result of the functions related to the maximum energy detection threshold $X_{Thresh\_max}$ of the communication device, the antenna transmission gain $A_{Tx}$ (θ), and the antenna reception gain $A_{Rx}$ (θ), as shown in Formula 3 below:

$$X_{Thresh\_max}(\theta) = X_{Thresh\_max} + g_{Tx}(A_{Tx}(\theta)) + g_{Rx}(A_{Rx}(\theta)) \quad \text{Formula 3}$$

$g_{Tx}$ ($A_{Tx}$ (θ)) represents a function related to the antenna transmission gain $A_{Tx}$ (θ), $g_{Rx}$ ($A_{Rx}$(θ)) represents a function related to the antenna reception gain $A_{Rx}$ (θ), and the second energy detection threshold $X_{Thresh\_max}$ (θ) is the maximum energy detection threshold in the spatial-domain transmission direction θ.

After determining the maximum energy detection threshold $X_{Thresh\_max}$ (θ) in the spatial-domain transmission direction θ, an energy detection threshold $X_{Thresh}$ smaller than or equal to the maximum energy detection threshold $X_{Thresh\_max}$ (θ) in the spatial-domain transmission direction θ is determined as the energy detection threshold in the spatial-domain transmission direction θ.

After the communication device determines the energy detection threshold $X_{Thresh}$ in the spatial-domain transmission direction θ, the communication device may perform channel-sensing in the spatial-domain transmission direction θ according to the energy detection threshold $X_{Thresh}$.

The communication device sets a maximum energy detection threshold, and corrects the maximum energy detection threshold of the communication device according to the antenna gain in the spatial-domain transmission direction θ, and determines the energy detection threshold obtained after the correction as the maximum energy detection threshold in the spatial-domain transmission direction θ, and further determines an energy detection threshold smaller than or equal to the maximum energy detection threshold in the spatial-domain transmission direction θ as the energy detection threshold in the spatial-domain transmission direction θ, thereby achieving more accurate determination of energy detection thresholds for channel-sensing in multiple spatial-domain transmission directions.

In the embodiments of the present disclosure, the communication device is configured with at least one bandwidth part (BWP); determining the energy detection threshold in the spatial-domain transmission direction, according to the antenna gain in the spatial-domain transmission direction, includes: determining the energy detection threshold of each BWP in the spatial-domain transmission direction, according to a bandwidth of each BWP of the at least one BWP and the antenna gain in the spatial-domain transmission direction.

The communication device may be configured with at least one spatial-domain transmission direction, and at least one BWP. The antenna gains in different spatial-domain transmission directions are not the same, and bandwidths of different BWPs are also not the same. In order to avoid a problem that accuracy of sensing a channel using the same energy detection threshold of different BWPs in different spatial-domain transmission directions results in a lower sensing accuracy, when the energy detection threshold of a certain BWP in a certain spatial-domain transmission direction is to be determined, the bandwidth of the BWP and the antenna gain in the spatial-domain transmission direction needs to be considered.

Ways of determining the energy detection threshold of each BWP in the spatial-domain transmission direction according to the bandwidth of each BWP and the antenna gain in the spatial-domain transmission direction include, but are not limited to, following two ways.

A first way is as follows.

In the embodiments of the present disclosure, determining the energy detection threshold of each BWP in the spatial-domain transmission direction according to the bandwidth of each BWP and the antenna gain in the spatial-domain transmission direction includes: determining the energy detection threshold of each BWP in the spatial-domain transmission direction according to an initial energy detection threshold, a bandwidth of the each BWP, and the antenna gain in the spatial-domain transmission direction, wherein the initial energy detection threshold is less than or equal to a maximum energy detection threshold of the communication device.

In particular, determining the energy detection threshold of each BWP in the spatial-domain transmission direction according to the initial energy detection threshold, the bandwidth of the each BWP and the antenna gain in the spatial-domain transmission direction, includes: correcting the initial energy detection threshold according to the bandwidth of the each BWP and the antenna gain in the spatial-domain transmission direction, to obtain a third energy detection threshold after the correction; and determining the third energy detection threshold as the energy detection threshold corresponding to the each BWP in the spatial-domain transmission direction.

The communication device sets the maximum energy detection threshold $X_{Thresh\_max}$ of the communication device according to a maximum transmission power of the communication device or a transmission bandwidth supported by the communication device, and further, sets an energy detection threshold less than or equal to the maximum energy threshold $X_{Thresh\_max}$ of the communication device as the initial energy detection threshold $X_{Thresh}$, and the initial energy detection threshold $X_{Thresh}$ takes the same value on different BWPs in different spatial-domain transmission directions.

The initial energy detection threshold $X_{Thresh}$ is corrected according to the bandwidth of a certain BWP and the antenna gain in a certain spatial-domain transmission direction, to obtain the third energy detection threshold after the correction; and the third energy detection threshold is determined as the energy detection threshold corresponding to the BWP in the spatial-domain transmission direction.

For example, the communication device is configured with N BWPs, wherein a bandwidth of an i-th BWP is $B_{i,bwp}$, i=1, . . . , N, N is a positive integer larger than or equal to 1. The initial energy detection threshold $X_{Thresh}$ is corrected according to the bandwidth $B_{i,bwp}$ of the i-th BWP, an antenna transmission gain $A_{Tx}(\theta)$ and an antenna reception gain $A_{Rx}(\theta)$ in the spatial-domain transmission direction θ, so as to obtain the third energy detection threshold $X_{Thresh}(\theta, B_{i,bwp})$ after the correction, the third energy detection threshold $X_{Thresh}(\theta, B_{i,bwp})$ after the correction is a function of the initial energy detection threshold $X_{Thresh}$, the bandwidth $B_{i,bwp}$ of the i-th BWP, the antenna transmission gain $A_{Tx}(\theta)$, and the antenna reception gain $A_{Rx}(\theta)$, shown in Formula 4 as follows.

$$X_{Thresh}(\theta, B_{i,bwp}) = f(X_{Thresh}, A_{Tx}(\theta), A_{Rx}(\theta), B_{i,bwp}) \quad \text{Formula 4}$$

The third energy detection threshold $X_{Thresh}(\theta, B_{i,bwp})$ is further determined as the energy detection threshold of the i-th BWP in the spatial-domain transmission direction.

It should be noted that the function $f(X_{Thresh}, A_{Tx}(\theta), A_{Rx}(\theta), B_{i,bwp})$ with respect to the initial energy detection threshold $X_{Thresh}$, the bandwidth $B_{i,bwp}$ of the i-th BWP, the antenna transmission gain $A_{Tx}(\theta)$, and the antenna reception gain $A_{Rx}(\theta)$ may be a linear function or a non-linear function, which is not specifically limited here.

In some embodiments of the present disclosure, correcting the initial energy detection threshold according to the bandwidth of the each BWP and the antenna gain in the spatial-domain transmission direction, to obtain the third energy detection threshold after the correction, includes: determining a linear superposition result of functions related to the initial energy detection threshold and the bandwidth of the BWP and a function related to the antenna gain in the spatial-domain transmission direction as the third energy detection threshold.

For example, the communication device is configured with N BWPs, wherein a bandwidth of the i-th BWP is $B_{i,bwp}$, i=1, . . . , N, N is a positive integer larger than or equal to 1. The initial energy detection threshold $X_{Thresh}$ is corrected according to the bandwidth $B_{i,bwp}$ of the i-th BWP, the antenna transmission gain $A_{Tx}(\theta)$ and the antenna reception gain $A_{Rx}(\theta)$ in the spatial-domain transmission direction θ, so as to obtain the third energy detection threshold $X_{Thresh}(\theta, B_{i,bwp})$ after the correction. The third energy detection threshold $X_{Thresh}$ ($\theta$, $B_{i,bwp}$) after the correction is a linear superposition result of functions related to the initial energy detection threshold $X_{Thresh}$, the bandwidth $B_{i,bwp}$ of the i-th BWP, and the antenna transmission gain $A_{Tx}$ ($\theta$), and a function of the antenna reception gain $A_{Rx}$ ($\theta$), as shown in Formula 5 as follows.

$$X_{Thresh}(\theta, B_{i,bwp}) = X_{Thresh} + g_{Tx}(A_{Tx}(\theta)) + g_{Rx}(A_{Rx}(\theta)) + g_{bwp}(B_{i,bwp}) \quad \text{Formula 5}$$

$g_{bwp}$ ($B_{i,bwp}$) represents a function related to the bandwidth B of the i-th BWP, $g_{Tx}$ ($A_{Tx}$ ($\theta$)) represents a function related to the antenna transmission gain $A_{Tx}$ ($\theta$), $g_{Rx}$ ($A_{Rx}$ ($\theta$)) represents a function related to the antenna reception gain $A_{Rx}$ ($\theta$), and the third energy detection threshold $X_{Thresh}$ ($\theta$, $B_{i,bwp}$) is the energy detection threshold of the i-th BWP in the spatial-domain transmission direction $\theta$.

After the communication device determines the energy detection threshold $X_{Thresh}$ ($\theta$, $B_{i,bwp}$) on the i-th BWP in the spatial-domain transmission direction $\theta$, the communication device may perform channel-sensing on the i-th BWP in the spatial-domain transmission direction $\theta$ according to the energy detection threshold $X_{Thresh}$ ($\theta$, $B_{i,bwp}$).

The communication device sets an initial energy detection threshold according to the maximum energy detection threshold, and then corrects the initial energy detection threshold according to the bandwidth of the i-th BWP and the antenna gain in the spatial-domain transmission direction $\theta$, and determines the energy detection threshold obtained after the correction as the energy detection threshold corresponding to the i-th BWP in the spatial-domain transmission direction $\theta$, thereby achieving more accurate determination of energy detection thresholds for channel-sensing on multiple BWPs in multiple spatial-domain transmission directions.

A second way is as follows.

In the embodiments of the present disclosure, determining the energy detection threshold of each BWP in the spatial-domain transmission direction according to the bandwidth of each BWP and the antenna gain in the spatial-domain transmission direction includes: determining a maximum energy detection threshold of the each BWP in the spatial-domain transmission direction according to a maximum energy detection threshold of the communication device, the bandwidth of the each BWP, and the antenna gain in the spatial-domain transmission direction; determining an energy detection threshold smaller than or equal to the maximum energy detection threshold of the each BWP in the spatial-domain transmission direction, as the energy detection threshold corresponding to the each BWP in the spatial-domain transmission direction.

Specifically, determining the maximum energy detection threshold of the each BWP in the spatial-domain transmission direction according to the maximum energy detection threshold of the communication device, the bandwidth of the each BWP, and the antenna gain in the spatial-domain transmission direction, includes: correcting the maximum energy detection threshold of the communication device according to the bandwidth of the each BWP and the antenna gain in the spatial-domain transmission direction, to obtain a fourth energy detection threshold after the correction; and determining the fourth energy detection threshold as the maximum energy detection threshold corresponding to the each BWP in the spatial-domain transmission direction.

The communication device sets the maximum energy detection threshold $X_{Thresh\_max}$ of the communication device according to a maximum transmission power of the communication device or a transmission bandwidth supported by the communication device, and corrects the maximum energy detection threshold $X_{Thresh\_max}$ according to a bandwidth of a certain BWP and the antenna gain in a certain spatial-domain transmission direction, to obtain the fourth energy detection threshold after the correction, and further determines the fourth energy detection threshold as the maximum energy detection threshold corresponding to the BWP in the spatial-domain transmission direction. After the maximum energy detection threshold of the BWP in the spatial-domain transmission direction is determined, an energy detection threshold smaller than or equal to the maximum energy detection threshold of the BWP in the spatial-domain transmission direction is set as the energy detection threshold corresponding to the BWP in the spatial-domain transmission direction.

For example, the communication device is configured with N BWPs, wherein a bandwidth of the i-th BWP is $B_{i,bwp}$, i=1, ..., N, N is a positive integer larger than or equal to 1. The maximum energy detection threshold $X_{Thresh\_max}$ of the communication device is corrected according to the bandwidth $B_{i,bwp}$ of the i-th BWP and an antenna transmission gain $A_{Tx}$ ($\theta$) and an antenna reception gain $A_{Rx}$ ($\theta$) in the spatial-domain transmission direction $\theta$, so as to obtain the fourth energy detection threshold $X_{Thresh\_max}$ ($\theta$, $B_{i,bwp}$) after the correction. The fourth energy detection threshold $X_{Thresh\_max}$ ($\theta$, $B_{i,bwp}$) is a function of the maximum energy detection threshold $X_{Thresh\_max}$ of the communication device, the bandwidth $B_{i,bwp}$ of the i-th BWP, the antenna transmission gain $A_{Tx}$ ($\theta$) and the antenna reception gain $A_{Rx}$ ($\theta$), shown in Formula 6 as follows.

$$X_{Thresh\_max}(\theta, B_{i,bwp}) = f(X_{Thresh\_max}, A_{Tx}(\theta), A_{Rx}(\theta), B_{i,bwp}) \quad \text{Formula 6}$$

The fourth energy detection threshold $X_{Thresh\_max}$ ($\theta$, $B_{i,bwp}$) is further determined as the maximum energy detection threshold corresponding to the i-th BWP in the spatial-domain transmission direction $\theta$.

It should be noted that the function $f(X_{Thresh\_max}, A_{Tx}$ ($\theta$), $A_{Rx}$ ($\theta$), $B_{i,bwp}$) with respect to the maximum energy detection threshold $X_{Thresh\_max}$ of the communication device, the bandwidth $B_{i,bwp}$ of the i-th BWP, the antenna transmission gain $A_{Tx}$ ($\theta$), and the antenna reception gain $A_{Rx}$ ($\theta$) may be a linear function or a non-linear function, which is not specifically limited here.

In the embodiments of the present disclosure, correcting the maximum energy detection threshold of the communication device according to the bandwidth of the each BWP and the antenna gain in the spatial-domain transmission direction, to obtain the fourth energy detection threshold after the correction, includes: determining a linear superposition result of a function related to the maximum energy detection threshold of the communication device and the bandwidth of the BWP and a function related to the antenna gain in the spatial-domain transmission direction as the fourth energy detection threshold.

For example, the communication device is configured with N BWPs, wherein a bandwidth of the i-th BWP is $B_{i,bwp}$, i=1, ..., N, N is a positive integer larger than or equal to 1. The maximum energy detection threshold $X_{Thresh\_max}$ of the communication device is corrected according to the bandwidth $B_{i,bwp}$ of the i-th BWP and the antenna transmission gain $A_{Tx}$ ($\theta$) and the antenna reception gain $A_{Rx}$ ($\theta$) in the spatial-domain transmission direction $\theta$, to obtain the fourth energy detection threshold $X_{Thresh\_max}$ ($\theta$, $B_{i,bwp}$) after the correction. The fourth energy detection threshold $X_{Thresh\_max}$ ($\theta$, $B_{i,bwp}$) is a linear superposition result of the functions related to the maximum energy detection threshold $X_{Thresh\_max}$ of the communication device and the bandwidth $B_{i,bwp}$ of the i-th BWP, a function related to the antenna transmission gain $A_{Tx}(\theta)$, and a function related to the antenna reception gain $A_{Rx}(\theta)$, as shown in Formula 7 below.

$$X_{Thresh\_max}(\theta, B_{i,bwp}) = X_{Thresh\_max} + g_{Tx}(A_{Tx}(\theta)) + g_{Rx}(A_{Rx}(\theta)) + g_{bwp}(B_{i,bwp})$$ Formula 7

$g_{bwp}(B_{i,bwp})$ represents a function related to the bandwidth $B_{i,bwp}$ of the i-th BWP, $g_{Tx}(A_{Tx}(\theta))$ represents a function related to the antenna transmission gain $A_{Tx}(\theta)$, $g_{Rx}(A_{Rx}(\theta))$ represents a function related to the antenna reception gain $A_{Rx}(\theta)$, and the fourth energy detection threshold $X_{Thresh\_max}(\theta, B_{i,bwp})$ is the maximum energy detection threshold of the i-th BWP in the spatial-domain transmission direction $\theta$.

After the communication device determines the maximum energy detection threshold $X_{Thresh\_max}(\theta, B_{i,bwp})$ on the i-th BWP in the spatial-domain transmission direction $\theta$, an energy detection threshold $X_{Thresh}$ smaller than or equal to the maximum energy detection threshold $X_{Thresh\_max}(\theta, B_{i,bwp})$ on the i-th BWP in the spatial-domain transmission direction $\theta$ is determined as the energy detection threshold corresponding to the i-th BWP in the spatial-domain transmission direction $\theta$.

After the communication device determines the energy detection threshold $X_{Thresh}$ on the i-th BWP in the spatial-domain transmission direction $\theta$, the communication device may perform channel-sensing on the i-th BWP in the spatial-domain transmission direction $\theta$ according to the energy detection threshold $X_{Thresh}$.

The communication device sets a maximum energy detection threshold, and corrects the maximum energy detection threshold of the communication device according to the bandwidth of the i-th BWP and the antenna gain in the spatial-domain transmission direction $\theta$, and determines the energy detection threshold obtained after the correction as the maximum energy detection threshold corresponding to the i-th BWP in the spatial-domain transmission direction $\theta$, and further determines an energy detection threshold smaller than or equal to the maximum energy detection threshold of the i-th BWP in the spatial-domain transmission direction $\theta$ as the energy detection threshold corresponding to the i-th BWP in the spatial-domain transmission direction $\theta$, thereby achieving more accurate determination of energy detection thresholds for channel-sensing on multiple BWPs in multiple spatial-domain transmission directions.

In the technical solutions described in the embodiments of the present disclosure, the energy detection threshold in a spatial-domain transmission direction is determined according to an antenna gain in the spatial-domain transmission direction for a communication operating in an unlicensed band, wherein the antenna gain includes at least one of following: an antenna transmission gain and an antenna reception gain, so that it is possible to achieve more accurate determination of energy detection thresholds for channel-sensing in multiple spatial-domain transmission directions.

Second Embodiment

FIG. 3 is a flowchart of another channel sensing method provided by some embodiments of the present disclosure. The method is applied to a communication device operating in an unlicensed band, the method includes a step 310.

Step 310: determining an energy detection threshold of a Bandwidth Part (BWP) according to a bandwidth of the BWP.

In practical applications, the communication device may be configured with at least one BWP, and bandwidths of different BWPs may not be the same. In order to avoid a problem that accuracy of sensing a channel using the same energy detection threshold of different BWPs results in a lower sensing accuracy, it is necessary to consider the bandwidth of a certain BWP in determining the energy detection threshold of the BWP.

Ways of determining the energy detection threshold of a BWP according to the bandwidth of the BWP include, but are not limited to, following two ways.

A first way is as follows.

In the embodiments of the present disclosure, determining the energy detection threshold of a BWP according to the bandwidth of the BWP includes: determining the energy detection threshold of the BWP according to an initial energy detection threshold and the bandwidth of the BWP, wherein the initial energy detection threshold is less than or equal to a maximum energy detection threshold of the communication device.

Specifically, determining the energy detection threshold of the BWP according to the initial energy detection threshold and the bandwidth of the BWP, includes: correcting the initial energy detection threshold according to the bandwidth of the BWP, to obtain a fifth energy detection threshold after the correction; and determining the fifth energy detection threshold as the energy detection threshold corresponding to the BWP.

The communication device sets the maximum energy detection threshold $X_{Thresh\_max}$ of the communication device according to a maximum transmission power of the communication device or a transmission bandwidth supported by the communication device, and further, sets an energy detection threshold $X_{Thresh}$ less than or equal to the maximum energy threshold $X_{Thresh\_max}$ of the communication device as the initial energy detection threshold, and the initial energy detection threshold $X_{Thresh}$ takes the same value on different BWPs.

The initial energy detection threshold $X_{Thresh}$ is corrected for each BWP according to the bandwidth of the BWP, to obtain the fifth energy detection threshold after the correction, and the fifth energy detection threshold is determined as the energy detection threshold corresponding to the BWP.

For example, the communication device is configured with N BWPs, wherein a bandwidth of an i-th BWP is $B_{i,bwp}$, i=1, . . . N, N is a positive integer larger than or equal to 1. The initial energy detection threshold $X_{Thresh}$ is corrected according to the bandwidth $B_{i,bwp}$ of the i-th BWP, so as to obtain the fifth energy detection threshold $X_{Thresh}(B_{i,bwp})$ after the correction, the fifth energy detection threshold $X_{Thresh}(B_{i,bwp})$ after the correction is a function of the initial energy detection threshold $X_{Thresh}$ and the bandwidth $B_{i,bwp}$ of the i-th BWP, shown in Formula 8 as follows.

$$X_{Thresh}(B_{i,bwp}) = f(X_{Thresh}, B_{i,bwp})$$ Formula 8

The fifth energy detection threshold $X_{Thresh}(\theta, B_{i,bwp})$ is further determined as the energy detection threshold corresponding to the i-th BWP.

It should be noted that the function $f(X_{Thresh}, B_{i,bwp})$ with respect to the initial energy detection threshold $X_{Thresh}$ and the bandwidth $B_{i,bwp}$ of the i-th BWP may be a linear function or a non-linear function, which is not specifically limited here.

In some embodiments of the present disclosure, correcting the initial energy detection threshold according to the bandwidth of the BWP to obtain the fifth energy detection threshold after the correction, includes: determining a linear superposition result of functions related to the initial energy detection threshold and the bandwidth of the BWP as the fifth energy detection threshold.

For example, the communication device is configured with N BWPs, wherein a bandwidth of the i-th BWP is $B_{i,bwp}$, i=1, ..., N, N is a positive integer larger than or equal to 1. The initial energy detection threshold $X_{Thresh}$ is corrected according to the bandwidth $B_{i,bwp}$ of the i-th BWP, so as to obtain the fifth energy detection threshold $X_{Thresh}(B_{i,bwp})$ after the correction. The fifth energy detection threshold $X_{Thresh}(B_{i,bwp})$ after the correction is a linear superposition result of functions related to the initial energy detection threshold $X_{Thresh}$ and the bandwidth $B_{i,bwp}$ of the i-th BWP, as shown in Formula 9 as follows.

$$X_{Thresh}(B_{i,bwp}) = X_{Thresh} + g_{bwp}(B_{i,bwp}) \qquad \text{Formula 9}$$

$g_{bwp}(B_{i,bwp})$ represents a function related to the bandwidth $B_{i,bwp}$ of the i-th BWP, and the fifth energy detection threshold $X_{Thresh}(B_{i,bwp})$ is the energy detection threshold of the i-th BWP.

After the communication device determines the energy detection threshold $X_{Thresh}(B_{i,bwp})$ on the i-th BWP, the communication device may perform channel-sensing on the i-th BWP according to the energy detection threshold $X_{Thresh}(B_{i,bwp})$.

The communication device sets an initial energy detection threshold according to the maximum energy detection threshold, and then corrects the initial energy detection threshold according to the bandwidth of the i-th BWP, and determines the energy detection threshold obtained after the correction as the energy detection threshold corresponding to the i-th BWP, thereby achieving more accurate determination of energy detection thresholds for channel-sensing on multiple BWPs.

A second way is as follows.

In the embodiments of the present disclosure, determining the energy detection threshold of a BWP according to the bandwidth of the BWP includes: determining a maximum energy detection threshold of the BWP according to a maximum energy detection threshold of the communication device and the bandwidth of the BWP; determining an energy detection threshold smaller than or equal to the maximum energy detection threshold of the BWP as the energy detection threshold corresponding to corresponding to the BWP.

Specifically, determining the maximum energy detection threshold of the BWP according to the maximum energy detection threshold of the communication device, the bandwidth of the BWP, includes: correcting the maximum energy detection threshold of the communication device according to the bandwidth of the BWP, to obtain a sixth energy detection threshold after the correction; and determining the sixth energy detection threshold as the maximum energy detection threshold corresponding to the BWP.

The communication device sets the maximum energy detection threshold $X_{Thresh\_max}$ of the communication device according to a maximum transmission power of the communication device or a transmission bandwidth supported by the communication device, and corrects the maximum energy detection threshold $X_{Thresh\_max}$ according to a bandwidth of a BWP, to obtain the sixth energy detection threshold after the correction, and further determines the sixth energy detection threshold as the maximum energy detection threshold corresponding to the BWP.

After the maximum energy detection threshold of the BWP is determined, an energy detection threshold smaller than or equal to the maximum energy detection threshold of the BWP is set as the energy detection threshold corresponding to the BWP.

For example, the communication device is configured with N BWPs, wherein a bandwidth of the i-th BWP is $B_{i,bwp}$, i=1, ..., N, N is a positive integer larger than or equal to 1. The maximum energy detection threshold $X_{Thresh\_max}$ of the communication device is corrected according to the bandwidth $B_{i,bwp}$ of the i-th BWP, so as to obtain the sixth energy detection threshold $X_{Thresh\_max}(B_{i,bwp})$ after the correction. The sixth energy detection threshold $X_{Thresh\_max}(B_{i,bwp})$ is a function of the maximum energy detection threshold $X_{Thresh\_max}$ of the communication device and the bandwidth $B_{i,bwp}$ of the i-th BWP, shown in Formula 10 as follows.

$$X_{Thresh\_max}(B_{i,bwp}) = f(X_{Thresh\_max}, B_{i,bwp}) \qquad \text{Formula 10}$$

The sixth energy detection threshold $X_{Thresh\_max}(B_{i,bwp})$ is further determined as the maximum energy detection threshold corresponding to the i-th BWP.

It should be noted that the function $f(X_{Thresh\_max}, B_{i,bwp})$ with respect to the maximum energy detection threshold $X_{Thresh\_max}$ of the communication device and the bandwidth $B_{i,bwp}$ of the i-th BWP may be a linear function or a non-linear function, which is not specifically limited here.

In the embodiments of the present disclosure, correcting the maximum energy detection threshold of the communication device according to the bandwidth of the BWP, to obtain the sixth energy detection threshold after the correction, includes: determining a linear superposition result of a function related to the maximum energy detection threshold of the communication device and the bandwidth of the BWP as the sixth energy detection threshold.

For example, the communication device is configured with N BWPs, wherein a bandwidth of the i-th BWP is $B_{i,bwp}$, i=1, ..., N, N is a positive integer larger than or equal to 1. The maximum energy detection threshold $X_{Thresh\_max}$ of the communication device is corrected according to the bandwidth $B_{i,bwp}$ of the i-th BWP, to obtain the sixth energy detection threshold $X_{Thresh\_max}(B_{i,bwp})$ after the correction. The sixth energy detection threshold $X_{Thresh\_max}(B_{i,bwp})$ is a linear superposition result of the functions related to the maximum energy detection threshold $X_{Thresh\_max}$ of the communication device and the bandwidth $B_{i,bwp}$ of the i-th BWP, as shown in Formula 11 below.

$$X_{Thresh\_max}(B_{i,bwp}) = X_{Thresh\_max} + g_{bwp}(B_{i,bwp}) \qquad \text{Formula 11}$$

$g_{bwp}(B_{i,bwp})$ represents a function related to the bandwidth $B_{i,bwp}$ of the i-th BWP, and the sixth energy detection threshold $X_{Thresh\_max}(B_{i,bwp})$ is the maximum energy detection threshold of the i-th BWP.

After the communication device determines the maximum energy detection threshold $X_{Thresh\_max}(B_{i,bwp})$ on the i-th BWP, an energy detection threshold $X_{Thresh}$ smaller than or equal to the maximum energy detection threshold $X_{Thresh\_max}(B_{i,bwp})$ on the i-th BWP is determined as the energy detection threshold corresponding to the i-th BWP.

After the communication device determines the energy detection threshold $X_{Thresh}$ on the i-th BWP, the communication device may perform channel-sensing on the i-th BWP according to the energy detection threshold $X_{Thresh}$.

The communication device sets a maximum energy detection threshold, and corrects the maximum energy detection threshold of the communication device according to the bandwidth of the i-th BWP, and determines the energy detection threshold obtained after the correction as the maximum energy detection threshold corresponding to the i-th BWP, and further determines an energy detection threshold smaller than or equal to the maximum energy detection threshold of the i-th BWP as the energy detection threshold corresponding to the i-th BWP, thereby achieving more accurate determination of energy detection thresholds for channel-sensing on multiple BWPs.

In the embodiments of the present disclosure, the communication device is configured with at least one spatial-domain transmission direction; determining the energy detection threshold of a BWP according to the bandwidth of the BWP, includes: determining an energy detection threshold of the BWP in each spatial-domain transmission direction of the at least one spatial-domain transmission direction according to a bandwidth of the BWP and an antenna gain in the each spatial-domain transmission direction, wherein the antenna gain in each spatial-domain transmission direction includes at least one of following: an antenna transmission gain and an antenna reception gain.

The communication device may be configured with at least one spatial-domain transmission direction, and at least one BWP. The antenna gains in different spatial-domain transmission directions are not the same, and bandwidths of different BWPs are also not the same. In order to avoid a problem that accuracy of sensing a channel using the same energy detection threshold of different BWPs in different spatial-domain transmission directions results in a lower sensing accuracy, when the energy detection threshold of a certain BWP in a certain spatial-domain transmission direction is to be determined, the bandwidth of the BWP and the antenna gain in the spatial-domain transmission direction needs to be considered.

Ways of determining an energy detection threshold of a BWP in each spatial-domain transmission direction according to the bandwidth of the BWP and an antenna gain in the each spatial-domain transmission direction include, but are not limited to, following two ways.

A first way is as follows.

In the embodiments of the present disclosure, determining the energy detection threshold of a BWP in a spatial-domain transmission direction according to the bandwidth of the BWP and the antenna gain in the spatial-domain transmission direction includes: determining the energy detection threshold of the BWP in the spatial-domain transmission direction according to an initial energy detection threshold, a bandwidth of the BWP, and the antenna gain in the spatial-domain transmission direction, wherein the initial energy detection threshold is less than or equal to a maximum energy detection threshold of the communication device.

In particular, determining the energy detection threshold of the BWP in the spatial-domain transmission direction according to the initial energy detection threshold, the bandwidth of the BWP and the antenna gain in the spatial-domain transmission direction, includes: correcting the initial energy detection threshold according to the bandwidth of the BWP and the antenna gain in the spatial-domain transmission direction, to obtain a seventh energy detection threshold after the correction; and determining the seventh energy detection threshold as the energy detection threshold corresponding to the BWP in the spatial-domain transmission direction.

The communication device sets the maximum energy detection threshold $X_{Thresh\_max}$ of the communication device according to a maximum transmission power of the communication device or a transmission bandwidth supported by the communication device, and further, sets an energy detection threshold $X_{Thresh}$ less than or equal to the maximum energy threshold $X_{Thresh\_max}$ of the communication device as the initial energy detection threshold, and the initial energy detection threshold $X_{Thresh}$ takes the same value on different BWPs in different spatial-domain transmission directions.

The initial energy detection threshold $X_{Thresh}$ is corrected according to the bandwidth of a certain BWP and the antenna gain in a certain spatial-domain transmission direction, to obtain the seventh energy detection threshold after the correction; and the seventh energy detection threshold is determined as the energy detection threshold corresponding to the BWP in the spatial-domain transmission direction.

For example, the communication device is configured with N BWPs, wherein a bandwidth of an i-th BWP is $B_{i,bwp}$, i=1, ..., N, N is a positive integer larger than or equal to 1. The initial energy detection threshold $X_{Thresh}$ is corrected according to the bandwidth $B_{i,bwp}$ of the i-th BWP, an antenna transmission gain $A_{Tx}(\theta)$ and an antenna reception gain $A_{Rx}(\theta)$ in the spatial-domain transmission direction $\theta$, so as to obtain the seventh energy detection threshold $X_{Thresh}(\theta, B_{i,bwp})$ after the correction, the seventh energy detection threshold $X_{Thresh}(\theta, B_{i,bwp})$ after the correction is a function of the initial energy detection threshold $X_{Thresh}$, the bandwidth $B_{i,bwp}$ of the i-th BWP, the antenna transmission gain $A_{Tx}(\theta)$, and the antenna reception gain $A_{Rx}(\theta)$, shown in Formula 12 as follows.

$$X_{Thresh}(\theta, B_{i,bwp}) = f(X_{Thresh}, A_{Tx}(\theta), B_{i,bwp}) \quad \text{Formula 12}$$

The seventh energy detection threshold $X_{Thresh}(\theta, B_{i,bwp})$ is further determined as the energy detection threshold corresponding to the i-th BWP in the spatial-domain transmission direction.

It should be noted that the function $f(X_{Thresh}, A_{Tx}(\theta), A_{Rx}(\theta), B_{i,bwp})$ with respect to the initial energy detection threshold $X_{Thresh}$, the bandwidth $B_{i,bwp}$ of the i-th BWP, the antenna transmission gain $A_{Tx}(\theta)$, and the antenna reception gain $A_{Rx}(\theta)$ may be a linear function or a non-linear function, which is not specifically limited here.

In some embodiments of the present disclosure, correcting the initial energy detection threshold according to the bandwidth of the BWP and the antenna gain in the spatial-domain transmission direction, to obtain the seventh energy detection threshold after the correction, includes: determining a linear superposition result of functions related to the initial energy detection threshold and the bandwidth of the BWP and a function related to the antenna gain in the spatial-domain transmission direction as the seventh energy detection threshold.

For example, the communication device is configured with N BWPs, wherein a bandwidth of the i-th BWP is $B_{i,bwp}$, i=1, ..., N, N is a positive integer larger than or equal to 1. The initial energy detection threshold $X_{Thresh}$ is corrected according to the bandwidth $B_{i,bwp}$ of the i-th BWP, the antenna transmission gain $A_{Tx}(\theta)$ and the antenna reception gain $A_{Rx}(\theta)$ in the spatial-domain transmission direction $\theta$, so as to obtain the seventh energy detection threshold $X_{Thresh}(\theta, B_{i,bwp})$ after the correction. The seventh energy detection threshold $X_{Thresh}(\theta, B_{i,bwp})$ after the correction is a linear superposition result of functions related to the initial energy detection threshold $X_{Thresh}$, the bandwidth $B_{i,bwp}$ of the i-th BWP, and the antenna transmission gain $A_{Tx}(\theta)$, and a function of the antenna reception gain $A_{Rx}(\theta)$, as shown in Formula 13 as follows.

$$X_{Thresh}(\theta, B_{i,bwp}) = X_{Thresh} + g_{Tx}(A_{Tx}(\theta)) + g_{Rx}(A_{Rx}(\theta)) + g_{bwp}(B_{i,bwp}) \quad \text{Formula 13}$$

$g_{bwp}(B_{i,bwp})$ represents a function related to the bandwidth $B_{i,bwp}$ of the i-th BWP, $g_{Tx}(A_{Tx}(\theta))$ represents a function related to the antenna transmission gain $A_{Tx}(\theta)$, $g_{Rx}(A_{Rx}(\theta))$ represents a function related to the antenna reception gain $A_{Rx}(\theta)$, and the seventh energy detection threshold $X_{Thresh}(\theta, B_{i,bwp})$ is the energy detection threshold of the i-th BWP in the spatial-domain transmission direction $\theta$.

After the communication device determines the energy detection threshold $X_{Thresh}(\theta, B_{i,bwp})$ on the i-th BWP in the spatial-domain transmission direction $\theta$, the communication device may perform channel-sensing on the i-th BWP in the spatial-domain transmission direction $\theta$ according to the energy detection threshold $X_{Thresh}(\theta, B_{i,bwp})$.

The communication device sets an initial energy detection threshold according to the maximum energy detection threshold, and then corrects the initial energy detection threshold according to the bandwidth of the i-th BWP and the antenna gain in the spatial-domain transmission direction $\theta$, and determines the energy detection threshold obtained after the correction as the energy detection threshold corresponding to the i-th BWP in the spatial-domain transmission direction $\theta$, thereby achieving more accurate determination of energy detection thresholds for channel-sensing on multiple BWPs in multiple spatial-domain transmission directions.

A second way is as follows.

In the embodiments of the present disclosure, determining the energy detection threshold of a BWP in each spatial-domain transmission direction according to the bandwidth of the BWP and the antenna gain in the spatial-domain transmission direction includes: determining a maximum energy detection threshold of the BWP in the spatial-domain transmission direction according to a maximum energy detection threshold of the communication device, the bandwidth of the BWP, and the antenna gain in the spatial-domain transmission direction; determining an energy detection threshold smaller than or equal to the maximum energy detection threshold of the BWP in the spatial-domain transmission direction, as the energy detection threshold corresponding to the BWP in the spatial-domain transmission direction.

Specifically, determining the maximum energy detection threshold of the BWP in the spatial-domain transmission direction according to the maximum energy detection threshold of the communication device, the bandwidth of the BWP, and the antenna gain in the spatial-domain transmission direction, includes: correcting the maximum energy detection threshold of the communication device according to the bandwidth of the BWP and the antenna gain in the spatial-domain transmission direction, to obtain an eighth energy detection threshold after the correction; and determining the eighth energy detection threshold as the maximum energy detection threshold corresponding to the BWP in the spatial-domain transmission direction.

The communication device sets the maximum energy detection threshold $X_{Thresh\_max}$ of the communication device according to a maximum transmission power of the communication device or a transmission bandwidth supported by the communication device.

The communication device corrects the maximum energy detection threshold $X_{Thresh\_max}$ according to a bandwidth of a certain BWP and the antenna gain in a certain spatial-domain transmission direction, to obtain the eighth energy detection threshold after the correction, and further determines the eighth energy detection threshold as the maximum energy detection threshold corresponding to the BWP in the spatial-domain transmission direction. After the maximum energy detection threshold of the BWP in the spatial-domain transmission direction is determined, an energy detection threshold smaller than or equal to the maximum energy detection threshold of the BWP in the spatial-domain transmission direction is set as the energy detection threshold corresponding to the BWP in the spatial-domain transmission direction.

For example, the communication device is configured with N BWPs, wherein a bandwidth of the i-th BWP is $B_{i,bwp}$, i=1, ..., N, N is a positive integer larger than or equal to 1. The maximum energy detection threshold $X_{Thresh\_max}$ of the communication device is corrected according to the bandwidth $B_{i,bwp}$ of the i-th BWP and an antenna transmission gain $A_{Tx}(\theta)$ and an antenna reception gain $A_{Rx}(\theta)$ in the spatial-domain transmission direction $\theta$, so as to obtain the eighth energy detection threshold $X_{Thresh\_max}(\theta, B_{i,bwp})$ after the correction. The eighth energy detection threshold $X_{Thresh\_max}(\theta, B_{i,bwp})$ is a function of the maximum energy detection threshold $X_{Thresh\_max}$ of the communication device, the bandwidth $B_{i,bwp}$ of the i-th BWP, the antenna transmission gain $A_{Tx}(\theta)$, and the antenna reception gain $A_{Rx}(\theta)$, shown in Formula 14 as follows.

$$X_{Thresh\_max}(\theta, B_{i,bwp}) = f(X_{Thresh\_max}, A_{Tx}(\theta), A_{Rx}(\theta), B_{i,bwp}) \quad \text{Formula 14}$$

The eighth energy detection threshold $X_{Thresh\_max}(\theta, B_{i,bwp})$ is further determined as the maximum energy detection threshold corresponding to the i-th BWP in the spatial-domain transmission direction $\theta$.

It should be noted that the function $f(X_{Thresh\_max}, A_{Tx}(\theta), A_{Rx}(\theta), B_{i,bwp})$ with respect to the maximum energy detection threshold $X_{Thresh\_max}$ of the communication device, the bandwidth $B_{i,bwp}$ of the i-th BWP, the antenna transmission gain $A_{Tx}(\theta)$ and the antenna reception gain $A_{Rx}(\theta)$ may be a linear function or a non-linear function, which is not specifically limited here.

In the embodiments of the present disclosure, correcting the maximum energy detection threshold of the communication device according to the bandwidth of the BWP and the antenna gain in the spatial-domain transmission direction, to obtain the eighth energy detection threshold after the correction, includes: determining a linear superposition result of a function related to the maximum energy detection threshold of the communication device and the bandwidth of the BWP and a function related to the antenna gain in the spatial-domain transmission direction as the eighth energy detection threshold.

For example, the communication device is configured with N BWPs, wherein a bandwidth of the i-th BWP is $B_{i,bwp}$, i=1, ..., N, N is a positive integer larger than or equal to 1. The maximum energy detection threshold $X_{Thresh\_max}$ of the communication device is corrected according to the bandwidth $B_{i,bwp}$ of the i-th BWP and the antenna transmission gain $A_{Tx}(\theta)$ and the antenna reception gain $A_{Rx}(\theta)$ in the spatial-domain transmission direction $\theta$, to obtain the eighth energy detection threshold $X_{Thresh\_max}(\theta, B_{i,bwp})$ after the correction. The eighth energy detection threshold $X_{Thresh\_max}(\theta, B_{i,bwp})$ is a linear superposition result of the functions related to the maximum energy detection threshold $X_{Thresh\_max}$ of the communication device and the bandwidth $B_{i,bwp}$ of the i-th BWP, a function related to the antenna transmission gain $A_{Tx}(\theta)$, and a function related to the antenna reception gain $A_{Rx}(\theta)$, as shown in Formula 15 below.

$$X_{Thresh\_max}(\theta, B_{i,bwp}) = X_{Thresh\_max} + g_{Tx}(A_{Tx}(\theta)) + g_{Rx}(A_{Rx}(\theta)) \times g_{bwp}(B_{i,bwp}) \quad \text{Formula 15}$$

$g_{bwp}(B_{i,bwp})$ represents a function related to the bandwidth $B_{i,bwp}$ of the i-th BWP, $g_{Tx}(A_{Tx}(\theta))$ represents a function related to the antenna transmission gain $A_{Tx}(\theta)$, $g_{Rx}$ ($A_{Rx}$ (θ)) represents a function related to the antenna reception gain $A_{Rx}$ (θ), and the eighth energy detection threshold $X_{Thresh\_max}$ (θ, $B_{i,bwp}$) is the maximum energy detection threshold of the i-th BWP in the spatial-domain transmission direction θ.

After the communication device determines the maximum energy detection threshold $X_{Thresh\_max}$ (θ, $B_{i,bwp}$) on the i-th BWP in the spatial-domain transmission direction θ, an energy detection threshold $X_{Thresh}$ smaller than or equal to the maximum energy detection threshold $X_{Thresh\_max}$ (θ, $B_{i,bwp}$) on the i-th BWP in the spatial-domain transmission direction θ is determined as the energy detection threshold corresponding to the i-th BWP in the spatial-domain transmission direction θ.

After the communication device determines the energy detection threshold $X_{Thresh}$ on the i-th BWP in the spatial-domain transmission direction θ, the communication device may perform channel-sensing on the i-th BWP in the spatial-domain transmission direction θ according to the energy detection threshold $X_{Thresh}$.

The communication device sets a maximum energy detection threshold, and corrects the maximum energy detection threshold of the communication device according to the bandwidth of the i-th BWP and the antenna gain in the spatial-domain transmission direction θ, and determines the energy detection threshold obtained after the correction as the maximum energy detection threshold corresponding to the i-th BWP in the spatial-domain transmission direction θ, and further determines an energy detection threshold smaller than or equal to the maximum energy detection threshold of the i-th BWP in the spatial-domain transmission direction θ as the energy detection threshold corresponding to the i-th BWP in the spatial-domain transmission direction θ, thereby achieving more accurate determination of energy detection thresholds for channel-sensing on multiple BWPs in multiple spatial-domain transmission directions.

In the technical solutions described in the embodiments of the present disclosure, the energy detection threshold of a BWP is determined according to a bandwidth of the BWP for a communication operating in an unlicensed band, so that it is possible to achieve more accurate determination of energy detection thresholds for channel-sensing on multiple BWPs.

It should be noted that, in the above-described different embodiments, specific function expressions of the function $g_{Tx}$ ($A_{Tx}$ (θ)) related to the $A_{Tx}$ (θ) may A or may not be the same; specific function expressions of the function $g_{Rx}$ ($A_{Rx}$ (θ)) related to the $A_{Rx}$ (θ) may or may not be the same; specific function expressions of the function $g_{bwp}$($B_{i,bwp}$) related to the $B_{i,bwp}$ may or may not be the same; specific function expressions of the function f($X_{Thresh}$, $A_{Tx}$(θ), $A_{Tx}$ (θ), $B_{bwp}$) related to the $X_{Thresh}$, the $A_{Tx}$ (θ), the $A_{Rx}$ (θ), the $B_{i,bwp}$ may or may not be the same; specific function expressions of the function f($X_{Thresh\_max}$, $A_{Tx}$ (θ) $A_{Rx}$, (θ), $B_{i,bwp}$) related to the $X_{Thresh\_max}$, the $A_{Tx}$ (θ), the $A_{Rx}$ (θ), the $B_{i,bwp}$ may or may not be the same, all of the above are not specifically defined herein.

Third Embodiment

FIG. 4 is a schematic structural diagram of a communication device provided by some embodiments of the present disclosure. The communication device 400 shown in FIG. 4 is applied to a communication device operating in an unlicensed band, and the terminal device 400 includes a determining module 401.

The determining module 401 is used for determining an energy detection threshold in a spatial-domain transmission direction according to an antenna gain in the spatial-domain transmission direction; wherein the antenna gain includes at least one of following: an antenna transmission gain and an antenna reception gain.

Optionally, the determining module 401 further includes: a first determining unit, used for determining the energy detection threshold in the spatial-domain transmission direction according to an initial energy detection threshold and the antenna gain, wherein the initial energy detection threshold is less than or equal to a maximum energy detection threshold of the communication device 400.

Optionally, the first determining unit further includes: a first correcting subunit, used for correcting the initial energy detection threshold according to the antenna gain, to obtain a first energy detection threshold after the correction; and a first determining subunit, used for determining the first energy detection threshold as the energy detection threshold in the spatial-domain transmission direction.

Optionally, the determining module 401 further includes: a second determining unit, used for determining a maximum energy detection threshold in the spatial-domain transmission direction according to a maximum energy detection threshold of the communication device 400 and the antenna gain; a third determining unit, used for determining an energy detection threshold smaller than or equal to the maximum energy detection threshold in the spatial-domain transmission direction, as the energy detection threshold in the spatial-domain transmission direction.

Optionally, the second determining unit further includes: a second correcting subunit, used for correcting the maximum energy detection threshold of the communication device 400 according to the antenna gain, to obtain a second energy detection threshold after the correction; a second determining subunit, used for determining the second energy detection threshold as the maximum energy detection threshold in the spatial-domain transmission direction.

Optionally, the communication device 400 is configured with at least one bandwidth part (BWP). The determining module 401 is further used for: determining the energy detection threshold of each BWP of the at least one BWP in the spatial-domain transmission direction according to a bandwidth of the BWP and the antenna gain.

Optionally, the determining module 401 further includes a fourth determining unit, used for determining the energy detection threshold of the BWP in the spatial-domain transmission direction according to the initial energy detection threshold, a bandwidth of the BWP, and the antenna gain, wherein the initial energy detection threshold is less than or equal to a maximum energy detection threshold of the communication device 400.

Optionally, the fourth determining unit further includes: a third correcting subunit, used for correcting the initial energy detection threshold according to the bandwidth of each BWP and the antenna gain, to obtain a third energy detection threshold after the correction; a third determining subunit, used for determining the third energy detection threshold as the energy detection threshold corresponding to the BWP in the spatial-domain transmission direction.

Optionally, the determining module 401 further includes; a fifth determining unit, used for determining a maximum energy detection threshold of each BWP in the spatial-domain transmission direction according to a maximum energy detection threshold of the communication device 400, the bandwidth of the BWP, and the antenna gain; a sixth determining unit, used for determining an energy detection threshold smaller than or equal to the maximum energy detection threshold of the BWP in the spatial-domain transmission direction, as the energy detection threshold corresponding to the BWP in the spatial-domain transmission direction.

Optionally, the fifth determining unit further includes: a fourth correcting subunit, used for correcting the maximum energy detection threshold of the communication device 400 according to the bandwidth of each BWP and the antenna gain, to obtain a fourth energy detection threshold after the correction; determining the fourth energy detection threshold as the maximum energy detection threshold corresponding to the each BWP in the spatial-domain transmission direction.

The communication device 400 provided in the embodiments of the present disclosure can implement various processes implemented by the communication device in the method embodiments of FIG. 2, and will not be described here again to avoid redundancy.

Fourth Embodiment

FIG. 5 is a schematic structural diagram of another communication device provided by some embodiments of the present disclosure. The communication device 500 shown in FIG. 5 is applied to a communication device operating in an unlicensed band, and the communication device 500 includes: a determining module 501, used for determining an energy detection threshold of a Bandwidth Part (BWP) according to a bandwidth of the BWP.

Optionally, the determining module 501 further includes: a first determining unit, used for determining the energy detection threshold of the BWP according to an initial energy detection threshold and the bandwidth of the BWP, wherein the initial energy detection threshold is less than or equal to a maximum energy detection threshold of the communication device 500.

Optionally, the first determining unit further includes: a first correcting subunit, used for correcting the initial energy detection threshold according to the bandwidth of the BWP, to obtain a fifth energy detection threshold after the correction; a first determining subunit, used for determining the fifth energy detection threshold as the energy detection threshold corresponding to the BWP.

Optionally, the determining module 501 further includes: a second determining unit, used for determining a maximum energy detection threshold of the BWP according to a maximum energy detection threshold of the communication device 500 and the bandwidth of the BWP; a third determining unit, used for determining an energy detection threshold smaller than or equal to the maximum energy detection threshold of the BWP as the energy detection threshold corresponding to the BWP.

Optionally, the second determining unit further includes: a second correcting subunit, used for correcting the maximum energy detection threshold of the communication device 500 according to the bandwidth of the BWP, to obtain a sixth energy detection threshold after the correction; a second determining subunit, used for determining the sixth energy detection threshold as the maximum energy detection threshold corresponding to the BWP.

Optionally, the communication device 500 is configured with at least one spatial-domain transmission direction. The determining module 501 is further used for: determining an energy detection threshold of the BWP in each spatial-domain transmission direction of the at least one spatial-domain transmission direction according to a bandwidth of the BWP and an antenna gain in the each spatial-domain transmission direction, wherein the antenna gain in each spatial-domain transmission direction includes at least one of following: an antenna transmission gain and an antenna reception gain.

Optionally, the determining module 501 further includes: a fourth determining unit, used for determining the energy detection threshold of the BWP in each spatial-domain transmission direction according to an initial energy detection threshold, a bandwidth of the BWP, and an antenna gain in the spatial-domain transmission direction, wherein the initial energy detection threshold is less than or equal to a maximum energy detection threshold of the communication device 500.

Optionally, the fourth determining unit further includes: a third correcting subunit, used for correcting the initial energy detection threshold according to the bandwidth of the BWP and the antenna gain in the each spatial-domain transmission direction, to obtain a seventh energy detection threshold after the correction; and determining the seventh energy detection threshold as the energy detection threshold corresponding to the BWP in the spatial-domain transmission direction.

Optionally, the determining module 501 further includes: a fifth determining unit, used for determining a maximum energy detection threshold of the BWP in each spatial-domain transmission direction according to a maximum energy detection threshold of the communication device 500, the bandwidth of the BWP, and the antenna gain in the each spatial-domain transmission direction; a sixth determining unit, used for determining an energy detection threshold smaller than or equal to the maximum energy detection threshold of the BWP in each spatial-domain transmission direction, as the energy detection threshold corresponding to the BWP in each spatial-domain transmission direction.

Optionally, the fifth determining unit further includes: a fourth correcting subunit, used for correcting the maximum energy detection threshold of the communication device 500 according to the bandwidth of the BWP and the antenna gain in each spatial-domain transmission direction, to obtain an eighth energy detection threshold after the correction; and determining the eighth energy detection threshold as the maximum energy detection threshold corresponding to the BWP in each spatial-domain transmission direction.

The communication device 500 provided in the embodiments of the present disclosure can implement various processes implemented by the communication device in the method embodiments of FIG. 3, and will not be described here again to avoid redundancy.

Fifth Embodiment

Figure 6:
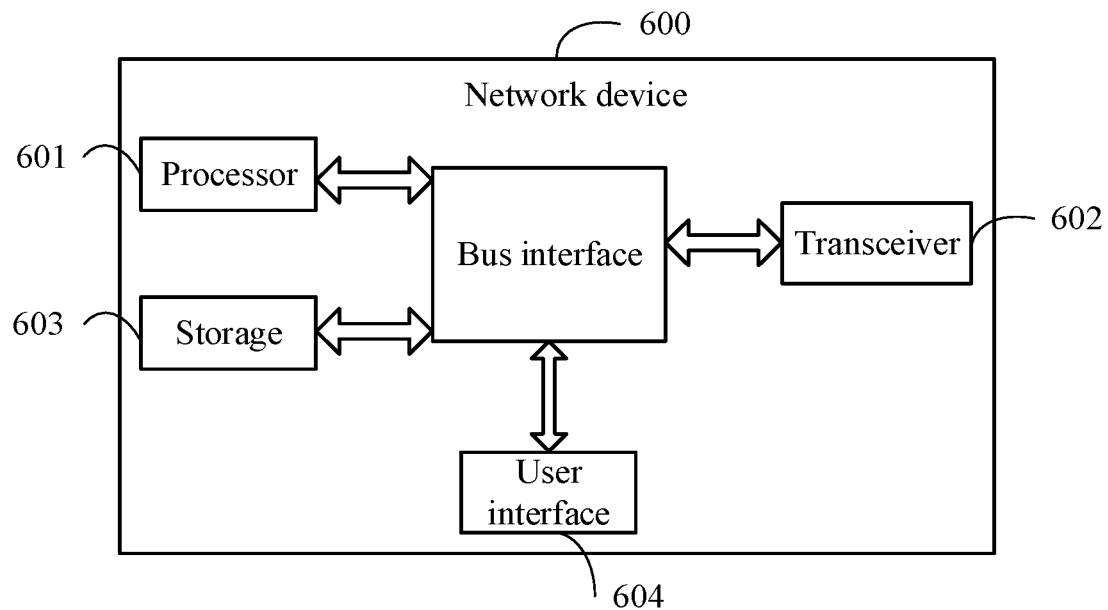
FIG. 6 is a schematic structural diagram of a network device provided by some embodiments of the present disclosure.

Referring to FIG. 6, FIG. 6 is a schematic structural diagram of a network device provided by some embodiments of the present disclosure, and can realize details of the method embodiments shown in FIG. 2 and/or FIG. 3, and achieve the same effect. As shown in FIG. 6, the network device 600 includes a processor 601, a transceiver 602, a storage 603, a user interface 604, and a bus interface, wherein, in some embodiments of the present disclosure, the network device 600 further includes a computer program stored on the storage 603 and executable by the processor 601, and when the computer program is executed by the processor 601, the processor 601 implements the following steps: determining an energy detection threshold in a spatial-domain transmission direction according to an antenna gain in the spatial-domain transmission direction, wherein the antenna gain includes at least one of an antenna transmission gain and an antenna reception gain; and/or, determining an energy detection threshold of a Bandwidth Part (BWP) according to a bandwidth of the BWP.

In FIG. 6, a bus architecture may include any number of interconnected buses and bridges, specifically various circuits such as one or more processors represented by the processor 601 and a memory represented by the storage 603 are linked together. The bus architecture may also link together various other circuits, such as peripheral devices, voltage regulators, and power management circuits, which are well known in the art, and thus will not be described further herein. The bus interface provides an interface. The transceiver 602 may be a plurality of elements, i.e., including a transmitter and a receiver, for providing elements for communicating with various other devices over a transmission medium. For different user equipments, the user interface 604 may also be an interface capable of connecting externally or internally a required device which includes, but is not limited to, a keypad, a display, a microphone, a speaker, and a joystick, and the like.

The processor 601 is responsible for managing the bus architecture and general processing, and the storage 603 may store data used by the processor 601 when performing operations.

The network device 600 can implement various processes implemented by the communication device in the embodiments shown in FIG. 2 and/or FIG. 3, and will not be described here again to avoid repetition.

Some embodiments of the present disclosure also provide a computer readable storage medium, wherein a computer program is stored on the computer readable storage medium. When the computer program is executed by a processor, each process in the method embodiments of FIG. 2 and/or FIG. 3 is realized, and the same technical effect can be achieved, and description thereof is omitted here to avoid repetition. The computer readable storage medium is, for example, a read-only memory (Read-Only Memory, ROM for short), a random access memory (Random Access Memory, RAM for short), a magnetic disk or an optical disc.

Figure 7:
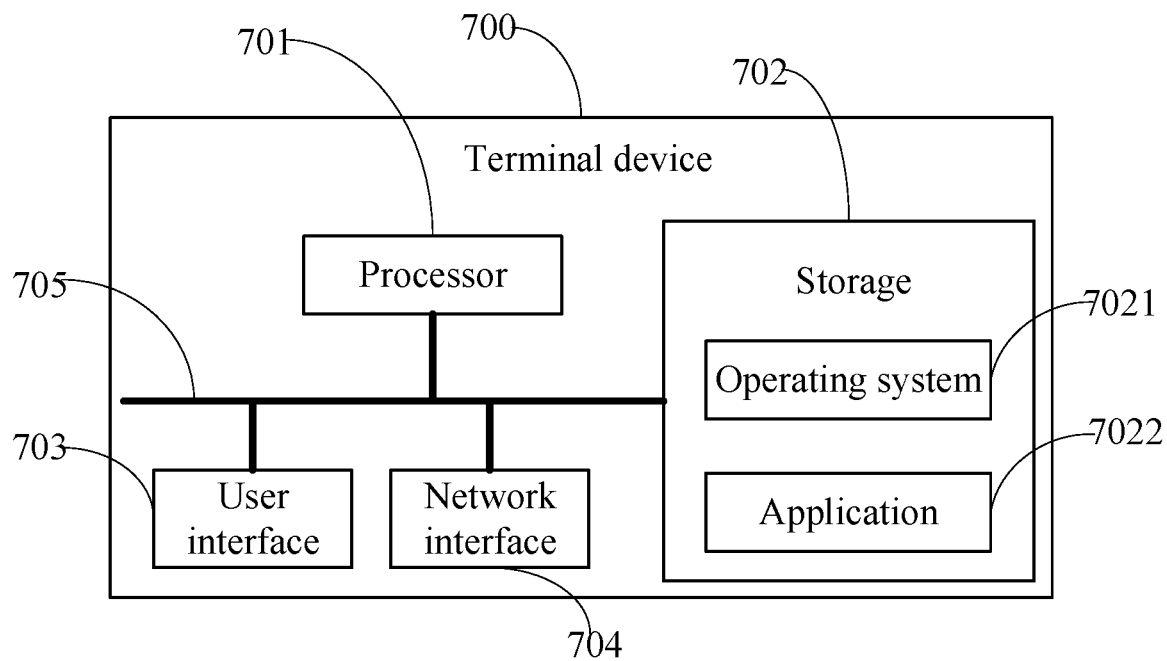
FIG. 7 is a schematic structural diagram of a terminal device provided by some embodiments of the present disclosure.

FIG. 7 is a schematic structural diagram of a terminal device provided by some embodiments of the present disclosure. The terminal device 700 shown in FIG. 7 includes at least one processor 701, a storage 702, at least one network interface 704, and a user interface 703. The components in the terminal device 700 are coupled together by a bus system 705. It will be appreciated that the bus system 705 is used to enable connection communication among these components. The bus system 705 includes a data bus, a power bus, a control bus, and a status signal bus. However, for sake of clarity of illustration, various buses are labeled as the bus system 705 in FIG. 7.

The user interface 703 may include a display, a keyboard, or a pointing device (e.g., a mouse, a trackball, a touchpad, a touch screen, or the like).

It will be appreciated that the storage 702 in the embodiments of the present disclosure may be a volatile memory or a non-volatile memory, or may include both volatile and non-volatile memories. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be random access memory (Random Access Memory, RAM), which serves as an external cache. By way of example but not limitation, many forms of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM) and a direct rambus random access memory (Direct Rambus RAM, DRRAM). The storage 702 in the system and the method described by the embodiments of the present disclosure is intended to include, but is not limited to, these and any other suitable types of memories.

In some embodiments, the storage 702 stores following elements, executable modules or data structures, or a subset thereof, or an extended set thereof: an operating system 7021 and an application 7022.

The operating system 7021 includes various system programs, such as a frame layer, a core library layer, a driver layer, and the like, for implementing various basic services and processing hardware-based tasks. The application 7022 includes various types of applications, such as a Media Player, a Browser, and the like, for implementing various application services. A program implementing the method of embodiments of the present application may be included in the application 7022.

In some embodiments of the present disclosure, the terminal device 700 further includes a computer program store on the storage 702 and executable on the processor 701, wherein when the computer program is executed by the processor 701, the processor 701 implements the follow steps: determining an energy detection threshold in a spatial-domain transmission direction according to an antenna gain in the spatial-domain transmission direction, wherein, the antenna gain includes at least one of following: an antenna transmission gain and an antenna reception gain; and/or determining an energy detection threshold of a Bandwidth Part (BWP) according to a bandwidth of the BWP.

The methods disclosed in the embodiments of the present disclosure described above may be applied in or implemented by the processor 701. The processor 701 may be an integrated circuit chip having signal processing capability. In an implementation process, the steps of the above-described method may be performed by an integrated logic circuit of hardware in the processor 701 or performed by instructions in a form of software. The processor 1201 may be a general purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, discrete gates or transistor logic devices, discrete hardware components. The methods, steps, and logical block diagrams disclosed in the embodiments of the present disclosure may be implemented or performed. The general purpose processor may be a microprocessor or the processor may also be any conventional processor or the like. The steps of the methods disclosed in connection with the embodiments of the present disclosure may be embodied directly as execution by a hardware decoding processor or as execution by a combination of hardware and software modules in the decoding processor. Software modules may be located in computer readable storage media mature in the art such as a random access memory, a flash memory, a read only memory, a programmable read only memory, or an electrically erasable programmable memory, a register, etc. The computer readable storage medium is located in the storage 702, the processor 701 reads information in the storage 702, and performs the steps of the above method in conjunction with hardware thereof. Specifically, a computer program is stored on the computer readable storage medium, and when the computer program is executed by the processor 701, the steps of the method embodiment in the FIG. 2 and/or FIG. 3 are implemented.

It will be appreciated that the embodiments described herein may be implemented in hardware, software, firmware, middleware, microcode, or a combination thereof. For hardware implementation, a processing unit may be implemented in one or more application specific integrated circuits (Application Specific Integrated Circuit, ASIC), a digital signal processor (Digital Signal Processor, DSP), a digital signal processor device (DSP Device, DSPD), a programmable logic device (Programmable Logic Device, PLD), a field-programmable gate array (Field-Programmable Gate Array, FPGA), a general purpose processor, a controller, a microcontroller, a microprocessor, other electronic units for performing functions described herein, or combinations thereof.

For software implementation, techniques described in the embodiments of the present disclosure may be implemented by means of modules (e.g., processes, functions, etc.) that perform the functions described in embodiments of the present disclosure. Software codes may be stored in a storage and executed by a processor. The storage may be implemented in the processor or external to the processor.

The terminal device 700 can implement various processes implemented by the communication device in the embodiments shown in FIG. 2 and/or FIG. 3, and will not be described here again to avoid repetition.

Some embodiments of the present disclosure also provide a computer readable storage medium, wherein a computer program is stored on the computer readable storage medium. When the computer program is executed by a processor, each process in the method embodiments of FIG. 2 and/or FIG. 3 is realized, and the same technical effect can be achieved, and description thereof is omitted here to avoid repetition. The computer readable storage medium is, for example, a read-only memory (Read-Only Memory, ROM for short), a random access memory (Random Access Memory, RAM for short), a magnetic disk or an optical disc.

It should also be noted that such term as "include", "comprise" or any other variant thereof is intended to cover non-exclusive inclusion, so that processes, methods, goods or devices including a series of elements include not only those elements but also other elements which are not explicitly listed, or may also include elements inherent to such processes, methods, goods, or devices. In absence of more restrictions, an element after a statement "including one" is not excluded from coexistence of additional identical elements in a process, a method, goods, or a device that includes the element.

From the above description of the embodiments, it will be apparent to those skilled in the art that methods in the above embodiments may be implemented by means of software plus a common necessary hardware platform, and of course may also be implemented by hardware, but in many cases the former is a better implementation. Based on such an understanding, an essential part or a part contributing the prior art in technical solutions of the present disclosure may be embodied in a form of a software product. The computer software product is stored in a storage medium such as an ROM/RAM, a magnetic disk, an optical disk, and includes instructions for enabling a terminal (which may be a mobile phone, a computer, a server, an air conditioner, or a network device or the like) to perform the methods described in various embodiments of the present disclosure.

The embodiments of the present disclosure have been described above in conjunction with the accompanying drawings, but the present disclosure is not limited to the embodiments described above, which are merely illustrative and not limiting. A person of ordinary skill in the art, under the teachings of the present disclosure, may also make many variations in forms, without departing from the spirit of the present disclosure and the protection scope of the claims, within the protection scope of the present disclosure.

What is claimed is:

1. A channel sensing method, the method being applied to a communication device operating in an unlicensed band, the method comprising:
    determining an energy detection threshold in a spatial-domain transmission direction, according to an antenna gain in the spatial-domain transmission direction;
    wherein the antenna gain comprises at least one of following: an antenna transmission gain and an antenna reception gain,
    the communication device is configured with at least one Bandwidth Part (BWP),
    determining the energy detection threshold in the spatial-domain transmission direction, according to the antenna gain in the spatial-domain transmission direction, comprises:
        determining the energy detection threshold of each BWP of the at least one BWP in the spatial-domain transmission direction, according to a bandwidth of the each BWP and the antenna gain.

2. The method according to claim 1, wherein determining the energy detection threshold in the spatial-domain transmission direction according to the antenna gain in the spatial-domain transmission direction further comprises:
    determining the energy detection threshold in the spatial-domain transmission direction, according to an initial energy detection threshold and the antenna gain, wherein the initial energy detection threshold is less than or equal to a maximum energy detection threshold of the communication device.

3. The method according to claim 2, wherein determining the energy detection threshold in the spatial-domain transmission direction, according to the initial energy detection threshold and the antenna gain, comprises:
    correcting the initial energy detection threshold, according to the antenna gain, to obtain a first energy detection threshold after correction;
    determining the first energy detection threshold as the energy detection threshold in the spatial-domain transmission direction.

4. The method according to claim 1, wherein determining the energy detection threshold in the spatial-domain transmission direction according to the antenna gain in the spatial-domain transmission direction, further comprises:
    determining a maximum energy detection threshold in the spatial-domain transmission direction, according to a maximum energy detection threshold of the communication device and the antenna gain;
    determining an energy detection threshold smaller than or equal to the maximum energy detection threshold in the spatial-domain transmission direction, as the energy detection threshold in the spatial-domain transmission direction.

5. The method according to claim 4, wherein determining the maximum energy detection threshold in the spatial-domain transmission direction according to the maximum energy detection threshold of the communication device and the antenna gain, comprises:
  correcting the maximum energy detection threshold of the communication device according to the antenna gain, to obtain a second energy detection threshold after correction;
  determining the second energy detection threshold as the maximum energy detection threshold in the spatial-domain transmission direction.

6. The method according to claim 1, wherein determining the energy detection threshold of the each BWP of the at least one BWP in the spatial-domain transmission direction according to the bandwidth of the each BWP and the antenna gain comprises:
  determining the energy detection threshold of the each BWP in the spatial-domain transmission direction, according to an initial energy detection threshold, a bandwidth of the each BWP, and the antenna gain, wherein the initial energy detection threshold is less than or equal to a maximum energy detection threshold of the communication device.

7. The method according to claim 6, wherein determining the energy detection threshold of the each BWP in the spatial-domain transmission direction according to the initial energy detection threshold, the bandwidth of the each BWP, and the antenna gain, comprises:
  correcting the initial energy detection threshold according to the bandwidth of the each BWP and the antenna gain, to obtain a third energy detection threshold after correction;
  determining the third energy detection threshold as the energy detection threshold corresponding to the each BWP in the spatial-domain transmission direction.

8. The method according to claim 1, wherein determining the energy detection threshold of the each BWP of the at least one BWP in the spatial-domain transmission direction according to the bandwidth of the each BWP and the antenna gain comprises:
  determining a maximum energy detection threshold of the each BWP in the spatial-domain transmission direction according to a maximum energy detection threshold of the communication device, the bandwidth of the each BWP, and the antenna gain;
  determining an energy detection threshold smaller than or equal to the maximum energy detection threshold of the each BWP in the spatial-domain transmission direction, as the energy detection threshold corresponding to the each BWP in the spatial-domain transmission direction.

9. A channel sensing method, the method being applied to a communication device operating in an unlicensed band, the method comprising:
  determining an energy detection threshold of a Bandwidth Part (BWP), according to a bandwidth of the BWP.

10. The method according to claim 9, wherein determining the energy detection threshold of the BWP according to the bandwidth of the BWP, comprises:
  determining the energy detection threshold of the BWP according to an initial energy detection threshold and the bandwidth of the BWP, wherein the initial energy detection threshold is less than or equal to a maximum energy detection threshold of the communication device.

11. The method according to claim 10, wherein determining the energy detection threshold of the BWP according to the initial energy detection threshold and the bandwidth of the BWP, comprises:
  correcting the initial energy detection threshold according to the bandwidth of the BWP, to obtain a fifth energy detection threshold after correction;
  determining the fifth energy detection threshold as the energy detection threshold corresponding to the BWP.

12. The method according to claim 9, wherein determining the energy detection threshold of the BWP according to the bandwidth of the BWP, comprises:
  determining a maximum energy detection threshold of the BWP according to a maximum energy detection threshold of the communication device and the bandwidth of the BWP;
  determining an energy detection threshold smaller than or equal to the maximum energy detection threshold of the BWP as the energy detection threshold corresponding to the BWP.

13. The method according to claim 12, wherein determining the maximum energy detection threshold of the BWP according to the maximum energy detection threshold of the communication device and the bandwidth of the BWP, comprises:
  correcting the maximum energy detection threshold of the communication device according to the bandwidth of the BWP, to obtain a sixth energy detection threshold after correction;
  determining the sixth energy detection threshold as the maximum energy detection threshold corresponding to the BWP.

14. The method according to claim 9, wherein the communication device is configured with at least one spatial-domain transmission direction;
  determining the energy detection threshold of the BWP according to the bandwidth of the BWP, comprises:
  determining an energy detection threshold of the BWP in each spatial-domain transmission direction of the at least one spatial-domain transmission direction according to the bandwidth of the BWP and the antenna gain in the each spatial-domain transmission direction,
  wherein the antenna gain in the each spatial-domain transmission direction comprises at least one of following: an antenna transmission gain and an antenna reception gain.

15. The method according to claim 14, wherein determining the energy detection threshold of the BWP in the each spatial-domain transmission direction of the at least one spatial-domain transmission direction according to the bandwidth of the BWP and the antenna gain in the each spatial-domain transmission direction, comprises:
  determining the energy detection threshold of the BWP in the each spatial-domain transmission direction according to an initial energy detection threshold, a bandwidth of the BWP, and the antenna gain in the each spatial-domain transmission direction, wherein the initial energy detection threshold is less than or equal to a maximum energy detection threshold of the communication device.

16. The method according to claim 15, wherein determining the energy detection threshold of the BWP in the each spatial-domain transmission direction according to the initial energy detection threshold, the bandwidth of the BWP, and the antenna gain in the each spatial-domain transmission direction, comprises:

correcting the initial energy detection threshold according to the bandwidth of the BWP and the antenna gain in the each spatial-domain transmission direction, to obtain a seventh energy detection threshold after correction;

determining the seventh energy detection threshold as the energy detection threshold corresponding to the BWP in the each spatial-domain transmission direction.

17. The method according to claim 14, wherein determining the energy detection threshold of the BWP in the each spatial-domain transmission direction of the at least one spatial-domain transmission direction according to the bandwidth of the BWP and the antenna gain in the each spatial-domain transmission direction, comprises:

determining a maximum energy detection threshold of the BWP in the each spatial-domain transmission direction according to a maximum energy detection threshold of the communication device, the bandwidth of the BWP, and the antenna gain in the each spatial-domain transmission direction;

determining an energy detection threshold smaller than or equal to the maximum energy detection threshold of the BWP in the each spatial-domain transmission direction, as the energy detection threshold corresponding to the BWP in the each spatial-domain transmission direction.

18. A communication device, comprising:

a storage, a processor, and a computer program stored on the storage and executable by the processor, wherein, when the computer program is executed by the processor, the processor implements following steps:

determining an energy detection threshold in a spatial-domain transmission direction, according to an antenna gain in the spatial-domain transmission direction;

wherein the antenna gain comprises at least one of following: an antenna transmission gain and an antenna reception gain, the communication device operates in an unlicensed band and is configured with at least one Bandwidth Part (BWP), determining the energy detection threshold in the spatial-domain transmission direction, according to the antenna gain in the spatial-domain transmission direction, comprises:

determining the energy detection threshold of each BWP of the at least one BWP in the spatial-domain transmission direction, according to a bandwidth of the each BWP and the antenna gain.

19. A communication device, comprising:

a storage, a processor, and a computer program stored on the storage and executable by the processor, wherein, when the computer program is executed by the processor, the processor implements following steps:

determining an energy detection threshold of a Bandwidth Part (BWP), according to a bandwidth of the BWP.

20. The communication device according to claim 19, wherein, determining the energy detection threshold of the BWP according to the bandwidth of the BWP, comprises:

determining the energy detection threshold of the BWP according to an initial energy detection threshold and the bandwidth of the BWP, wherein the initial energy detection threshold is less than or equal to a maximum energy detection threshold of the communication device.

* * * * *